(12) United States Patent
Uemura et al.

(10) Patent No.: US 7,536,652 B2
(45) Date of Patent: *May 19, 2009

(54) USING STRUCTURES AND URGENCY CALCULATORS FOR DISPLAYING INFORMATION TO INDICATE BOTH THE IMPORTANCE AND THE URGENCY OF THE INFORMATION

(75) Inventors: Marcelo R. Uemura, Seattle, WA (US); Daniel Joseph Rogers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/178,105

(22) Filed: Jul. 8, 2005

(65) Prior Publication Data

US 2005/0246658 A1 Nov. 3, 2005

Related U.S. Application Data

(62) Division of application No. 10/147,424, filed on May 16, 2002, now Pat. No. 7,051,284.

(51) Int. Cl.
*G06F 3/048* (2006.01)
(52) U.S. Cl. .................. 715/805; 715/752; 715/809; 709/206
(58) Field of Classification Search .............. 700/100; 715/752

See application file for complete search history.

(56) References Cited

U.S. PATENT DOCUMENTS

| | | | | |
|---|---|---|---|---|
| 5,588,105 | A * | 12/1996 | Foster et al. ................. | 715/779 |
| 5,894,321 | A * | 4/1999 | Downs et al. ............ | 348/14.09 |
| 5,930,524 | A * | 7/1999 | Sasaki .......................... | 710/19 |
| 5,943,652 | A * | 8/1999 | Sisley et al. .................... | 705/9 |
| 6,381,580 | B1 * | 4/2002 | Levinson ....................... | 705/8 |
| 6,456,996 | B1 * | 9/2002 | Crawford et al. ............... | 707/1 |
| 6,499,017 | B1 * | 12/2002 | Feibelman et al. ............. | 705/8 |
| 6,560,222 | B1 | 5/2003 | Pounds | |
| 6,834,274 | B2 * | 12/2004 | Tafoya ........................ | 706/50 |
| 6,954,897 | B1 | 10/2005 | Noguchi | |
| 7,027,996 | B2 * | 4/2006 | Levinson ....................... | 705/8 |

(Continued)

OTHER PUBLICATIONS

Microsoft Outlook 2000, Copyright 1995-1999 Microsoft Corp. Screenshots submitted.*

(Continued)

*Primary Examiner*—Sara M Hanne
(74) *Attorney, Agent, or Firm*—Workman Nydegger

(57) ABSTRACT

Data items contained in personal information are displayed in manner that is indicative of both the importance and the urgency of the data items. A first visual cue is assigned to the data item based on an importance of the data item. The first visual cue may cause more important items to be displayed with increased size and less important items to be displayed with decreased size. A second visual cue is assigned to the data item based on an urgency of the data item. The second visual cue may cause more urgent items to be displayed in a first color and less important items to be displayed in a second color. The data item is displayed using the first and second visual cue as to provide a visual indication as to both the importance and urgency of the data item.

20 Claims, 3 Drawing Sheets

U.S. PATENT DOCUMENTS

| | | | |
|---|---|---|---|
| 7,111,297 B1* | 9/2006 | Sankaranarayan et al. | 718/104 |
| 7,120,865 B1 | 10/2006 | Horvitz | |
| 7,174,368 B2 | 2/2007 | Ross | |
| 2002/0041757 A1* | 4/2002 | Takahashi | 386/95 |
| 2002/0075302 A1 | 6/2002 | Simchik | |
| 2002/0087649 A1* | 7/2002 | Horvitz | 709/207 |
| 2002/0087757 A1* | 7/2002 | Wagner | 710/54 |
| 2003/0046401 A1* | 3/2003 | Abbott et al. | 709/228 |
| 2003/0187937 A1 | 10/2003 | Yao | |
| 2004/0103092 A1* | 5/2004 | Tuzhilin et al. | 707/3 |
| 2006/0010391 A1 | 1/2006 | Uemura | 715/752 |
| 2006/0075350 A1 | 4/2006 | Uemura | 715/752 |

OTHER PUBLICATIONS

Gini Courter and Annette Marquis "Masteringtm Microsoft® Office 2000, Professional Edition", SYBEX, Copyright 1999, pp. 388-393, 461, 471-474.*

Office Action mailed Aug. 10, 2007 cited in related U.S. Appl. No. 11/227,248.

Squarified Treemaps, Mr. Bruls, et. Al. Proceedings of the Joint Eurographics and IEEE TCVG Symposium on Visualization, Publ by Springer-Verlag/Wein, Wien, Austria, 2000, pp. 33-42.

Cushion Treemaps: Visualization of Hierarchical Information, J.J. Van Wijk and H. Van de Wetering, Proceedings 1999 IEEE Symposium on Information Visualization (InfoVis'99), Publ. by IEEE Comput. Soc., Los Alamitos, CA, USA, 1999, pp. 73-78, 147.

Improving the Visualization of Hierarchies with Treemaps: Design Issues and Experimentation, D. Turo and B. Johnson, Proceedings, Visualization '92 (Cat. No. 92CH3201-1), Publ. by IEEE Comput. Soc. Press, Los Alamitos, CA, USA, 1992, pp. 124-131, Cp-16 Black and White Version, CP-16 Color Version.

Using Treemaps to Visualize the Analytic Hierarchy Process, T. Asahi et al., Information Systems Research, V 6, N4, Dec. 1995, pp. 357-375.

Office Action dated Feb. 25, 2008 cited in related U.S. Appl. No. 11/227,248.

* cited by examiner

USING STRUCTURES AND URGENCY CALCULATORS FOR DISPLAYING INFORMATION TO INDICATE BOTH THE IMPORTANCE AND THE URGENCY OF THE INFORMATION

CROSS REFERENCE TO RELATED APPLICATIONS

This application is a divisional of U.S. patent application Ser. No. 10/147,424 entitled "DISPLAYING INFORMATION TO INDICATE BOTH THE IMPORTANCE AND THE URGENCY OF THE INFORMATION", filed May 16, 2002 which is incorporated herein by reference.

BACKGROUND OF THE INVENTION

1. The Field of the Invention

The present invention relates to displaying personal information at a video display device. More specifically, the present invention relates to systems, methods, and computer program products for displaying consolidated personal information from different applications in a manner that indicates both the importance and urgency of data items included in the personal information.

2. Background and Relevant Art

Computers have revolutionized our way of life by enhancing our ability to view information. An individual need only have a computer system containing application programs and a computer monitor to be able to view a wide variety of personal information. Application programs often access such personal information from local storage devices (e.g. hard disks) and/or computer networks (e.g. the Internet) and display the information at a computer monitor.

Personal information, such as that accessed by application programs, may be viewed as having both an urgency and an importance. Urgent personal information may be information that requires immediate action or attention by a particular user. For example, a meeting that is occurring in five minutes. Important personal information may be personal information that has significant value to the particular user. For example, spending time with one's spouse.

Some personal information may be both urgent and important. For example, a meeting with the company president in five minutes. However, other personal information may have increased urgency and decreased importance. For example, a meeting with an annoying sales person in five minutes. Likewise, other personal information may have increased importance and decreased urgency. For example, attending a grandchild's little league game in two weeks.

Application programs often include the functionality to display visual reminders associated with personal information. For example, reminding a user of a currently scheduled meeting or that a bill is past due. These visual reminders are frequently displayed to alert a user as to a level of urgency associated with personal information. However, such visual reminders are not displayed based on the importance of personal information. Further, such visual reminders do not include any indication of the importance of personal information when the visual reminders are displayed. This is problematic, as a user may desire to be made aware of the importance of personal information as well as the urgency of personal information.

Further each application may store personal information in a different format. A calendar application may store personal information in a first format, an electronic message application may store personal information in a second format, a financial application may store personal information in a third format, etc. Thus, even if such applications were capable of displaying personal information based on importance or in a manner that indicates importance, a number of applications would have to be able to display the importance of personal information from different aspects of a person's life.

Therefore, what are desired are systems, methods, and computer program products, for displaying personal information so as to indicate both the importance and the urgency of the personal information.

BRIEF SUMMARY OF THE INVENTION

Methods, systems, and computer program products are described for displaying consolidated personal information for a number of different applications in a manner that indicates both the importance and the urgency of data items contained in the personal information. Data items included in personal information may be associated with an urgency visual cue and an importance visual cue. When personal information is displayed at a video display device, these visual cues affect the appearance of data items contained in the personal information.

In accordance with the present invention, a user-indication of an importance level associated with a particular data item is received. The particular data item may be a portion of personal information associated with a user that provided the user-indication. An importance level may be a value that represents the relative importance of the particular data item compared to other data items. An importance level may be received from a computer system input device or from a database. An application program may be configured to update a database when the application program detects a change in a user's personal information. For example, if a user changes a project in a scheduling program, the scheduling program may automatically update importance levels for data items associated with the project.

Extensible Markup Language ("XML") tags may be used to facilitate storing data items from different application programs in a uniform format. Application programs may utilize the XML tags to associate data items with a name, an importance, and an urgency. Data items from a number of different applications may store data items in a database where each data item is associated with a name, importance, and urgency in a uniform format.

A first visual cue associated with the data item is assigned based on an importance of the data item and a second visual cue associated with the data item is assigned based on an urgency of the data item. An assignable visual cue may include, for example, screen space allocation for a data item, display color of a data item, display brightness of a data item, or data item indicators, such as flashing video. In some embodiments, importance of the data item is assigned to screen space allocation, and urgency of the data item is assigned to display color. A visual cue may also cause more specific data items to be presented within more general data items. For example, a visual cue may cause a more specific stock value data item to be contained within a more general financial status data item when displayed on a video output device.

The data item is displayed using the first and second visual cues to provide the user an indication as to both the importance and urgency of the data item. In some embodiments, the screen space allocated to display the data item may cue the user as to the relative importance of the data item. Likewise, the display color of the data item may indicate to the user the relative urgency of the data item. Changes in the importance and/or urgency values for one data item may affect how other data items are presented. For example, if the importance value of a data item is increased, screen space allocated for display of the data item may also be increased. This may cause screen space allocated for display of other data items to be decreased.

Screen space may be appropriately allocated between varying levels of relative importance so that each data item of the same level of importance is allocated the same amount of screen space. Further, screen space may be allocated so that the total screen space consumed by all the data items equals or is less than the total screen space of a single video output device. Thus, a user may have a "complete view" of personal information from a number of different applications. When a new data item is to be displayed, the relative importance of existing data items is diluted. This causes the screen space allocated for existing data items to be reduced. These reductions free up screen space so the new data item along with all existing data items are still displayed on a single video output device.

Using a first visual cue for importance and a second visual cue for urgency when displaying data items enables a user to better judge what data items to act on and when to act. Including data items with first and second visual cues in a "complete view" enables a user to better manage personal information as all personal information is simultaneously viewable in a meaningful manner.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
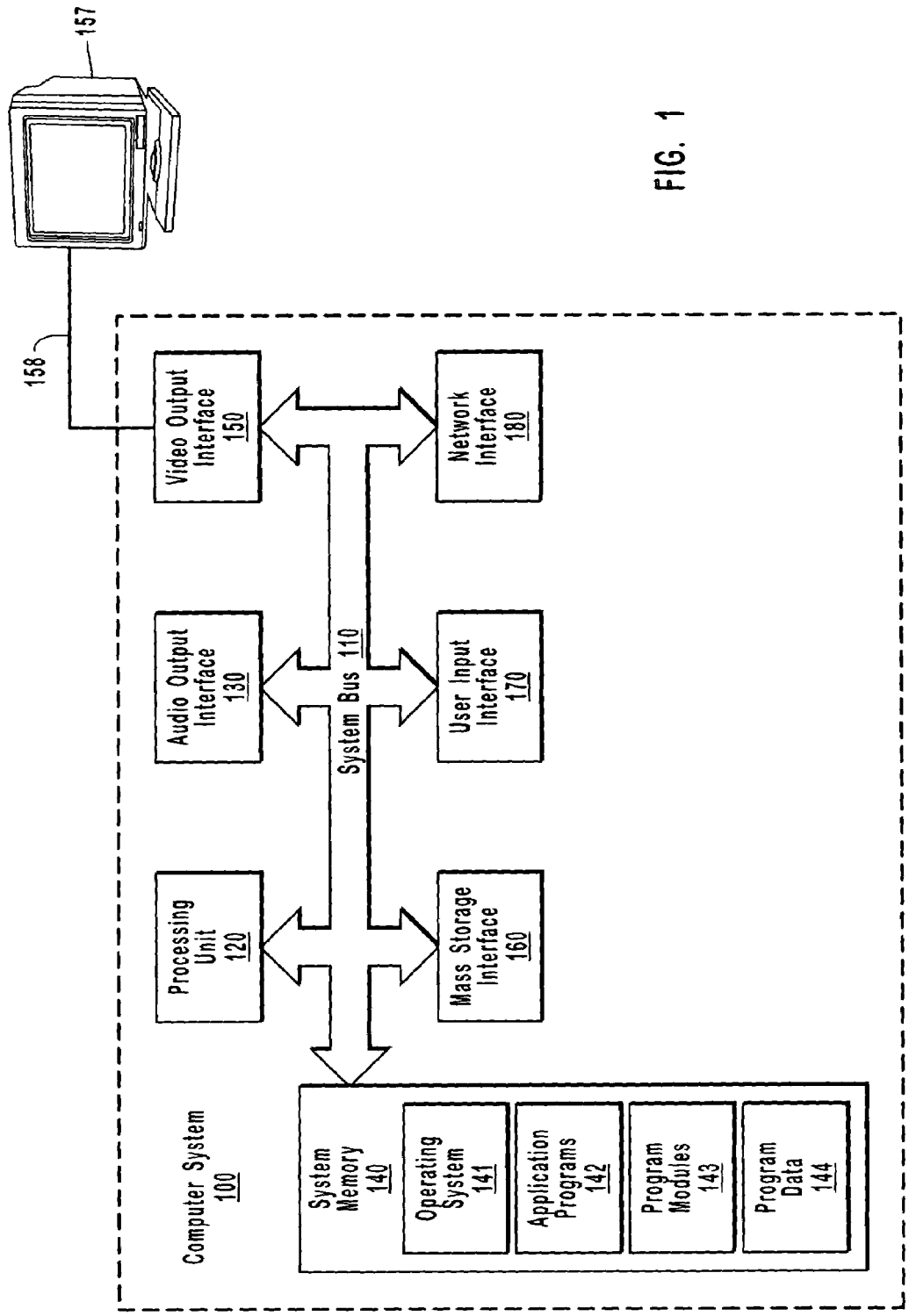
FIG. 1 illustrates an example of a computer system that provides a suitable operating environment for the present invention.

The present invention extends to systems, methods, and computer program products for displaying personal information from a plurality of application programs in a manner that indicates both the importance and the urgency of data items contained in the personal information.

In operation, a user-indication of an importance level associated with a data item (e.g., a data item representing a portion of personal information) is received. The received importance level may be a numeric value that associates the data item with a relative level of importance when compared to the importance of other data items. A first visual cue associated with the data item is assigned based on the importance of the data item. More important data items may be displayed with increased size and less important data items may be displayed with decreased size. A second visual cue associated with the data item is assigned based on the urgency of the data item. More urgent data items may be displayed in a first color and less urgent data items may be displayed in a second color. The data item may be stored, along with data items from a plurality of application programs in a format that is uniform for data items associated with each application program in the plurality of application programs. The data item is displayed using the first visual cue and the second visual cue to give a visual indication as to both the importance and urgency of the data item.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including personal computers, laptop computer, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

With reference to FIG. 1, a suitable operating environment for the principles of the invention includes a general-purpose computer system in the form of a computer system 100. Computer system 100 may be a desktop computer system that has been adapted to perform the operations disclosed herein.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

Computer system 100 may include user input interface 170, which may receive information from an input device such as, for example, a keyboard, mouse, microphone, or remote control. An input device may be coupled to user input interface 170 so as to enable the entry of information. An input device may transfer information over such a coupling in response to preprogrammed data or user manipulation of the input device.

Computer system 100 may also include video output interface 150, which may provide a video output signal to external video display devices. Computer system 100 may be integrally positioned with or separate from a video display device, such as, for example, computer monitor 157. Computer monitor 157 may be configured to display items of different sizes and to display items in different colors. Computer monitor 157 may be further configured to appropriately update displayed items that change in size and/or color dynamically. Computer monitor 157 may be coupled to video output interface 150 via video link 158 so as to receive a provided video output signal.

Similarly, computer system 100 may also include audio output interface 130, which may provide an audio output signal to external audio output devices. Computer system 100 may be integrally positioned with or separate from an audio system, which may include a speaker or other device capable of emitting sound data. An audio system may be coupled to audio output interface 130 so as to receive a provided audio output signal.

Computer system 100 includes processing unit 120, which may allow for complex and flexible general-purpose processing capabilities. Processing unit 120 may execute computer-executable instructions designed to implement features of computer system 100, including features of the present invention. Processing unit 120 is coupled via system bus 110, which also interconnects various other system components, such as system memory 140. System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 may include mass storage interface 160, which may read data from and/or write data to a mass storage device, such as, for example, a magnetic disk storage device or optical disk storage device. A mass storage device may be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computer system 100 may include network interface 180, through which computer system 100 may receive data from or transmit data to external sources, such as for example, external computer systems or databases. Computer system 100 may be network connectable to networks that include external computer systems and/or databases and may exchange data with such computer systems and databases.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In this description and in the following claims, a "logical communication link" is defined as any communication path that may enable the transport of electronic data between two entities such as computer systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Logical communication links may include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of a Virtual Private Network ("VPN").

In accordance with the present invention, display modules as well as associated data, including data items contained in personal information may be stored and accessed from any of the computer-readable media associated with computer system 100. For example, portions of such modules and portions of associated program data may be included in operating system 141, application programs 142, program modules 143 and/or program data 144, for storage in system memory 140. If a mass storage device is coupled to computer system 100, such modules and associated program data may also be stored in the mass storage device. Execution of such modules may be performed in a distributed environment as previously described.

Figure 2:
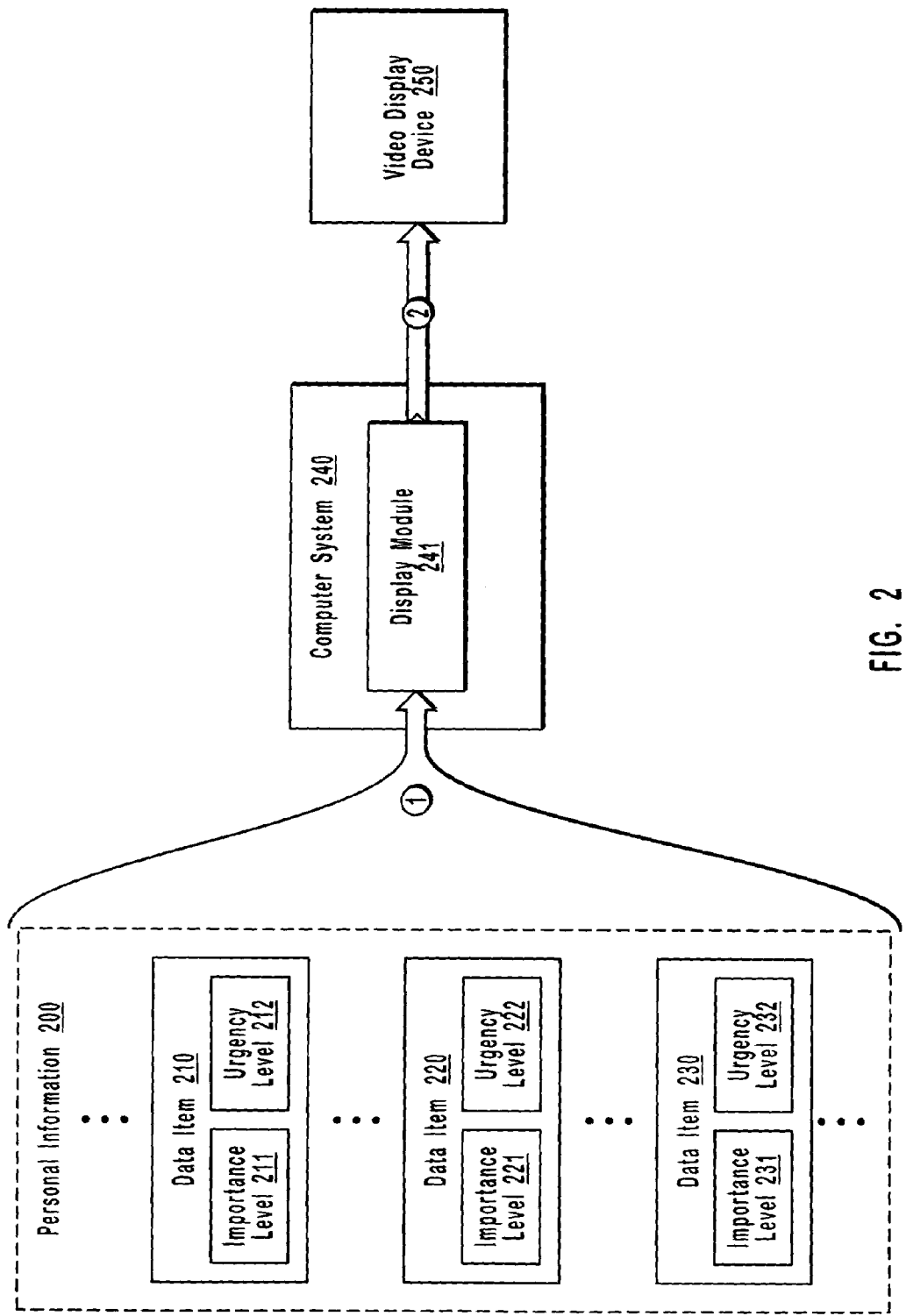
FIG. 2 illustrates an example of some of the functional components that may facilitate displaying data items using an importance visual cue and an urgency visual cue.

FIG. 2 illustrates some of the functional components that may facilitate displaying data items using an importance visual cue and an urgency visual cue. Shown in FIG. 2 is personal information 200, which includes a plurality of data items. Personal information 200 may represent a database that stores data items. Data items stored in personal information 200 may be data items that are associated with different application programs. For example, data item 210 may be associated with a calendar application program, data item 220 may be associated with an electronic messaging application program, and data item 230 may be associated with a financial application program. Each data item in personal information 200 may include an importance level, representing the importance of the data item and an urgency level, representing the urgency of the data item. For example, data item 210 includes importance level 211 and urgency level 212.

In this description and in the claims, an "urgency level" or the "urgency" of a data item means a degree to which the data item suggests immediate action or course of action on the part of the user. While these terms suggest immediate action or course of action, they do not suggest the value to the user in completing the immediate action or engaging in the course of action. For example, a reminder to meeting with annoying salesperson in 5 minutes is urgent since it suggests immediate action in preparing for the meeting, even though the successful preparation for the meeting is not critical to the user.

An "importance level" or the "importance" of a data item means the value to the user in the suggested action being successful accomplished or the course of action being properly engaged in, regardless of when the action should be accomplished or when the course of action should be engaged in. For example, spending time with one's spouse may be important to a user, regardless of when that time is.

Also shown in FIG. 2 is computer system 240, which includes display module 241. Display module 241 may utilize visual cues identified for and/or assigned to the importance and urgency of data items to cause data items to be displayed at video display device 250. Video display device 250 may be a computer monitor configured similarly to computer monitor 157.

Figure 3:
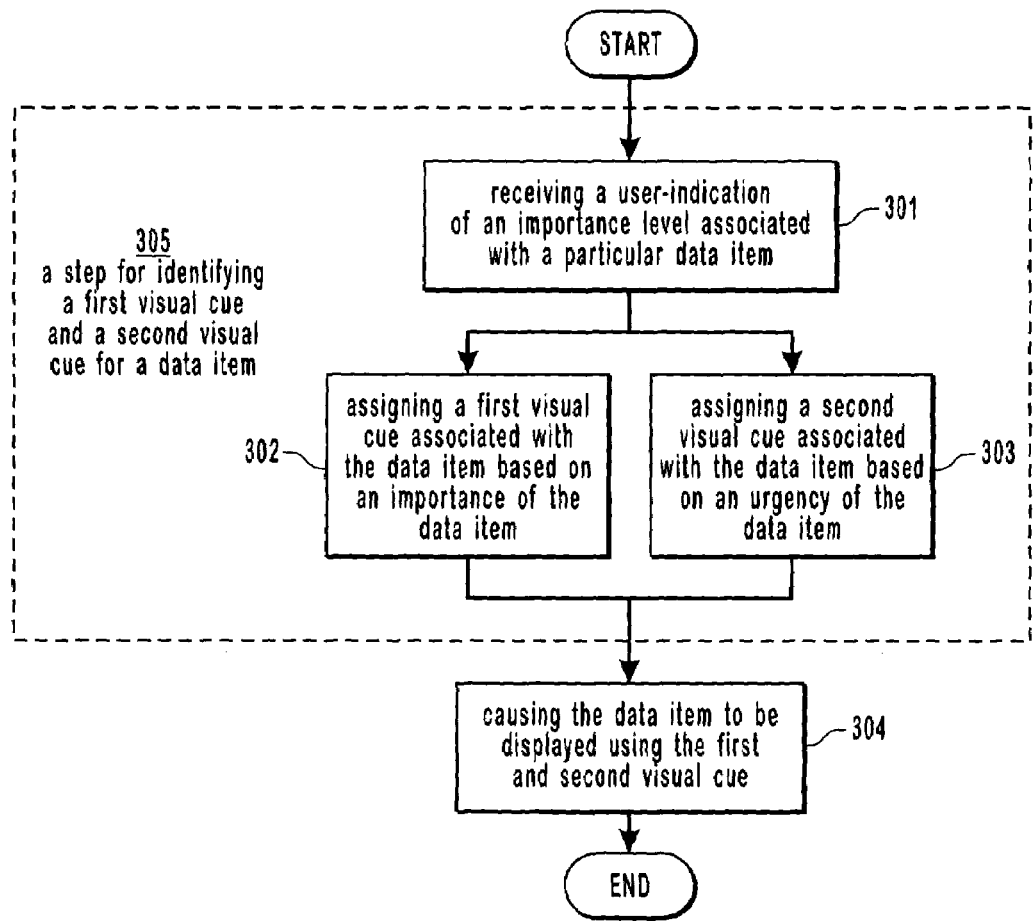
FIG. 3 is a flow diagram illustrating an example of a method for displaying data items using an importance visual cue and an urgency visual cue.

FIG. 3 is a flow diagram illustrating an example of a method for displaying data items using an importance visual cue and an urgency visual cue. The method in FIG. 3 will be discussed with reference to the functional components included in FIG. 2.

The method in FIG. 3 may begin with a functional, result-oriented step for identifying a first visual cue and a second visual cue for a data item (step 305). An identifiable visual cue may include visual characteristics, such as, for example, display color, display size (e.g. screen space allocation), and display intensity (e.g. brightness). An identifiable visual cue may also include more dynamic visual characteristics such as, for example, varying display colors, varying display size, or varying display intensity (e.g. flashing video) over time or at specified time intervals. A plurality of visual characteristics, for example, varying the intensity and the color of a data item once every second, may be included in an identified visual cue for a data item.

The first visual cue may be associated with the importance of a data item and the second visual cue may be associated with the urgency of a data item. The first visual cue and the second visual cue may differ, for example, a visual cue of display size may be associated with importance and a visual cue of display color may be associated with urgency. The data item may be a portion of personal information associated with a user.

In one example embodiment, data items are displayed in a three-dimensional representation. The perceived distance from a data item represents the importance of the data item and display intensity or display color represent the urgency of the data item. By using a three-dimensional representation, a clear indication of the importance of a data item can be conveyed to a user. More important data items would be perceived by the user to be closer and less important data items would be perceived by the user to be further away. Thus, the user may be "compelled" to deal with data items that are closer (more important) rather than data items that are urgent only.

In some embodiments, a first sound cue and/or a second sound cue may be identified. An identifiable sound cue may include audio characteristics, such as, for example, loudness, pitch, timbre, frequency, amplitude, and harmonic constitution that make up a sound. An identifiable audio cue may also include varying audio characteristics over time or at specified intervals and/or a combination of different audio characteristics. The first sound cue may be associated with the importance of a data item and the second sound cue may be associated with the urgency of the data item. The first sound cue and the second sound cue may be different sound cues.

Step 305 may include a corresponding act of receiving a user-indication of an importance level associated with a particular data item (act 301). The particular data item may be a portion of personal information associated with the user that provided the user-indication. As shown in FIG. 2 by arrow 1, display module 241 receives personal information 200. Each data item contained in personal information 200 includes an importance level, for example, data item 220 includes importance level 221. An importance level for a data item may be represented by a numeric value. The numeric value may indicate a relative level of importance of the particular data item when compared to other data items. For example, a first data item with an importance level value of 10 may be viewed as more important than a second data item with an importance level value of 5 but less important than a third data item with an importance level value of 20.

It may be that a user associated with personal information 200 previously entered importance levels for each data item contained in personal information 200. Importance levels may be entered from an input device, such as an input device coupled to user input interface 170.

In some embodiments, application programs may be configured to store data items in personal information 200. Thus, personal information 200 may include data items from a plurality of different application programs. When an application program detects a change in a user's personal information, data items stored in personal information 200 may be updated. A user may configure application programs to update stored data items in a desired manner. For example, a user may configure a scheduling program to automatically update importance levels for the data items of a project when changes in the project are detected. Although different application programs may store data items in different formats when storing data items for self-retrieval, the data items contained in personal information 200 may be stored in a uniform format across the different applications. Data items may be stored in a uniform format using any storage system that can store hierarchical information, such as, for example, databases or extensible mark-up language ("XML") files.

When using XML files, application programs may be associated with XML tags that facilitate storing data items in a database in accordance with a potentially extensible, but predefined, uniform format. A plurality of application programs may each have XML tags that facilitate storing and updating data items. A personal information manager may have XML tags to update contact and calendaring information, a personal finance program may have XML tags to update account balances or stock prices, etc. XML tags for each application program may be configured so that data items from different application programs are stored and updated in a uniform format. Thus, any module configured to access data in the uniform format, may access meaningful data items associated with different application programs. The data items contained in personal information 200 may be in a uniform format that is accessible by display module 241.

An example of storing data items in a uniform format will be described with reference to XML. In the XML example of this description, data items are organized in a hierarchical form independent of the program applications that generated the data items. The following description is illustrative only. It would be apparent to one skilled in the art, after having reviewed this description, that a wide variety of programming languages and programming techniques may be used to implement computer-executable or computer-readable instructions for storing data items in a uniform format. In the XML example of this description, when a sole period is encountered on three consecutive lines (i.e., a vertical ellipsis), this represents that other instructions may precede the illustrated instructions or that some other instructions may follow the illustrated instructions. Numbers enclosed in brackets are line numbers and are included for informational purposes to aid in clarifying the description of the instructions.

```
[01]<karma>
[02]   <node name="Family" importance="40">
[03]     <node name="Wife" importance="20">
[04]     </node>
[05]     <node name="Son" importance="40">
[06]       <node name="CollegeEducation" importance="100"
lastUrgency="-30">
[07]         <urgencyCalculator url="http://yearsuntilcollege.com">
[08]         </urgencyCalculator>
[09]       </node>
[10]     </node>
[11]   </node>
[12]   <node name="Finance" importance="30">
[13]     <node name="Education" importance="100">
[14]       <node name="CollegeEducation" importance="30"
lastUrgency="-30">
[15]         <urgencyCalculator url="http ://yearsuntilcollege.com">
[16]         </urgencyCalculator>
[17]       </node>
[18]       <node name"NewComputer" importance="20"
lastUrgency="40">
[19]         <urgencyCalculator
[20]             url="http://assetmanagement.com/mystuff/
mycomputer">
[21]         </urgencyCalculator>
[22]       </node>
[23]     <node name="Taxes" importance="100" lastUrgency="2">
[24]         <urgencyCalculator application="Money
Management Program">
[25]         </urgencyCalculator>
[26]       </node>
[27]     </node>
[28]   </node>
[29]</karma>
```

Shown at line 0 in the XML example is the opening tag that corresponds to a closing tag at line 29. Accordingly, lines 01 through 29 define an element entitled "Karma". Node subelements contained in the Karma element (hereinafter referred to simply as "nodes") are indicated by a "<node>"-"</node>" pair (e.g. the <node> at line 05 and the </node> at line 10). Each node represents a data item that is a portion of personal information for a user. Further, each node includes a name attribute and a name attribute value. For example, the node at line 02 includes a name attribute with a name attribute value of "Family". Throughout the description of the XML example, a node may be referred to by its included name attribute value. For example, the node at line 02 may be referred to as the "Family Node" at line 02.

The nodes in the XML example are arranged in a node hierarchy where each node may contain one or more subnodes. For example, the Family node at line 02 contains the Wife subnode at line 03 and the Son subnode at line 05. The Son subnode at line 05 further contains the CollegeEducation subnode at line 06. The CollegeEducation subnode at line 06 is also viewed as "leaf node" because no subnodes are contained in the CollegeEducation subnode at line 06.

Each node, whether it is a node, subnode, or leaf node, also includes an importance attribute and an importance attribute value. The importance attribute value for a node represents the importance level of the node with a numeric value ranging from 1 (less important) to 100 (more important). This numeric value may have been received as a user-indication of an importance level in act 301. It should be understood that the numeric range from 1 to 100 is merely an example and that other numeric ranges may be used.

Each leaf node, such as those at lines 06, 14, 18, and 23, also includes a lastUrgency attribute and a lastUrgency attribute value. The lastUrgency attribute value for a node represents the last urgency level that was reported for the node with a numeric value ranging from −100 (less urgent) to 100 (more urgent). Each leaf node contains an urgencyCalculator element (e.g. at lines 07, 15, 19, and 24) representing an urgency calculator program (hereinafter referred to as an "urgency calculator") that calculates lastUrgency attribute values. It should be understood that the numeric range from −100 to 100 is merely an example and that other numeric ranges may be used.

Different urgency calculators may be used to calculate lastUrgency attribute values for different leaf nodes. An addressing mechanism may be used to reference a particular urgency calculator used to calculate a lastUrgency attribute value for a particular data item. Urgency calculators used to calculate lastUrgency attribute values may be contained in the computer system where the data items are stored and/or may be contained in networked computer systems, such as, for example, computer systems that are network connectable to the Internet.

A url attribute and url attribute value may be used to reference urgency calculators contained in networked computer systems. The url attribute value may be a Uniform Resource Locator ("URL") that is used to access an urgency calculator contained in a computer system on the World Wide Web ("WWW"). For example, at line 07 the url attribute value "http://yearsuntilcollege.com" references an urgency calculator that calculates a lastUrgency attribute value for the CollegeEducation leaf node at line 06. The url attribute value may also be used to reference Simple Object Access Protocol ("SOAP") calls, or even to present a question to a user.

Likewise, an application attribute and application attribute value may be used to reference urgency calculators contained in the computer system where data items are stored. The application attribute value may be a name of an urgency calculator that is used to access the urgency calculator. For example, at line 24 the application attribute value "Money Management Program" references an urgency calculator that calculates lastUrgency attribute value for Taxes leaf node at line 23.

It should be understood that URLs and urgency calculator names are merely examples of addressing mechanisms. Other addressing mechanisms, such as, for example, Internet Protocol ("IP") addresses, Domain Name Services ("DNS"), electronic mail addresses, application program aliases (e.g. short cuts), and the like, may be used when implementing the principles of the present invention. Further, the principles of the present invention do not depend on any particular addressing mechanism when referencing urgency calculators that calculate lastUrgency attribute values. It would be apparent to one skilled in the art, after having reviewed this description, that a wide variety of addressing mechanisms, in addition to those described, may be used to reference urgency calculators that calculate lastUrgency attribute values.

Urgency calculators (e.g. those referenced by application attribute values or url attribute values) can be implemented using virtually any technique that is capable of returning a value in a specified range (i.e. −100 to 100), such as, for example, Structured Query Language ("SQL") statements, SOAP calls, Component Object Model ("COM") automation objects, and spreadsheet values. Urgency calculators may be flexibly configurable to calculate lastUrgency attribute values for data items of existing and future data formats.

Different methods may be used to calculate a lastUrgency attribute value for a data item. For example, if a deadline for a two hour assignment is in the next ten hours but all the time in the next ten hours is already booked, a lastUrgency attribute value for the deadline may be set equal to 100 since the deadline will not be met unless we decide we are not doing something else. On the other hand, if a deadline for the two hour assignment is in the next week and there is plenty of free time in the next week, a lastUrgency attribute value for the deadline may be set equal to −100. Further, methods for lastUrgency attribute values need not be associated with deadlines. For example, for a budget data item, instead of calculating the lastUrgency attribute value based on likelihood of satisfying a deadline, the lastUrgency attribute value may be calculated based on being under or over budget.

The lastUrgency values for non-leaf nodes may be calculated by averaging the lastUrgency attribute values for leaf nodes that are contained in the non-leaf nodes. For example, the lastUrgency value for the Education subnode at line 13 is equal to 4, which is the average of the lastUrgency attribute value of the CollegeEducation subnode at line 14 (i.e. −30), the lastUrgency attribute value of the NewComputer subnode at line 18 (i.e. 40), and the lastUrgency attribute value of the Taxes subnode at line 23 (i.e. 2).

As illustrated in the XML example, the Son subnode at line 05 and Education subnode at line 13 each contain a CollegeEducation subnode (i.e the CollegeEducation subnodes at lines 06 and 14). This illustrates that the same data item may be included in different aspects of a user's life. The CollegeEducation subnode at line 06 includes an importance attribute value of 100 and the CollegeEducation subnode at line 14 includes an importance attribute value of 30. This indicates that CollegeEducation may be more important to an aspect of a user's family life and less important to an aspect of the user's financial life.

In some embodiments, XML tags are used to facilitate the gathering of data items from different databases. Databases may be contained in local computer systems, as well as remote computer systems that are accessed over a network, such as, for example, the Internet. For example, data items in personal information 200 may be gathered from databases contained in computer system 240, as well as databases contained in other computer systems that are network connectable to computer system 240. Data items may be transported over a network using various protocols, including SOAP.

Step 305 may include a corresponding act of assigning a first visual cue associated with the data item based on the importance of the data item (act 302). Display module 241 may assign a first visual cue to a data item contained in personal information 200. The assigned first visual cue may be based on the importance level of the data item. For example, display module 241 may assign a first visual cue to data item 230 based on importance level 231.

An assigned first visual cue may be associated with one or more visual characteristics, such as, for example, display color, display size (e.g. screen space allocation), and display intensity (e.g. brightness). The importance level of a data item may be assigned a first visual cue that includes a display size visual characteristic. The display size of a particular data item may be varied based on an importance level associated with the data item. The particular data item may be displayed as larger than other data items associated with lower levels of importance. The particular data item may be displayed as smaller than other data items associated with higher levels of importance.

An assigned first visual cue may also include more dynamic visual characteristics such as, for example, varying display colors, varying display size, or varying display intensity (e.g. flashing video) over time or at specified time intervals. A plurality of visual characteristics, for example, varying the colors of data items of different sizes at specified time intervals, may be included in an assigned first visual cue for a data item. In one example embodiment, a first visual cue is assigned to a three-dimensional representation of the data item. A user may perceive the data item as closer than other data items with lower levels of importance and further away than other data items with higher levels of importance.

In parallel with act 301, step 305 may include a corresponding act of assigning a second visual cue associated with the data item based on the urgency of the data item (act 302). Display module 241 may assign a second visual cue to a data item contained in personal information 200. The assigned second visual cue may be based on the urgency level of the data item. For example, display module 241 may assign a second visual cue to data item 230 based on urgency level 232.

An urgency level may be represented by a numeric value that indicates a relative level of urgency of the particular data item compared to other data items. For example, a first data item with an urgency level value of 20 may be viewed as more urgent than a second data item with an urgency level value of 10 but less urgent than a third data item with an urgency level value of 30.

It should be understood that the use of numeric values to indicate the relative importance or urgency of a data item is merely an example. It would be apparent to one skilled in the art, after having reviewed this description, that a wide variety of techniques, in addition to using numeric values, may be used to indicate the relative importance or relative urgency of a particular data item.

An assigned second visual cue may be associated with one or more visual characteristics, such as, for example, display color, display size (e.g. screen space allocation), and display intensity (e.g. brightness). The urgency level of a data item may be assigned a second visual cue that includes a display color visual characteristic. The display color for a particular data item may be varied based on a relative urgency level associated with the data item. The particular data item may be displayed in a color that is different than the display color of other data items associated with lower levels of urgency. Likewise, the particular data item may be displayed in a color that is different than the display color of other data items associated with higher levels of urgency. The second visual cue may be associated with visual characteristics that are different from the visual characteristics associated with the first visual cue. In one example embodiment, a second visual cue is assigned to a three-dimensional representation of the data item. The color or brightness of the data item may vary based on the urgency level of the data item.

In some embodiments, relative urgency levels may cause a data item to be classified as an urgent data item or a non-urgent data item. A data item with a relative urgency level greater than some predetermined urgency level may be classified as an urgent data item. Urgent data items may be assigned a second visual cue of being displayed in a first color that is indicative of a data item being classified as urgent (hereinafter referred to as an "urgent color"). A data item with a relative urgency level less than the predetermined urgency level may be classified as a non-urgent data item. Non-urgent data items may be assigned a second visual cue of being displayed in a second color that is indicative of a data item being classified as non-urgent (hereinafter referred to as a "non-urgent color"). In some cases, an urgent color may be a red color and a non-urgent color may be a green color.

An assigned second visual cue may also include more dynamic visual characteristics such as, for example, varying display colors, varying display size, or varying display intensity (e.g. flashing video) over time or at specified time intervals. A plurality of visual characteristics may be included in an assigned second visual cue for a data item.

In some embodiments, the importance of the data item and/or the urgency of the data may be assigned to a sound cue. Further, it may be that importance is assigned to a visual cue and urgency is assigned to a sound cue or vice versa. For example, importance may be assigned to a visual cue of varying display size and urgency may be assigned to a sound cue of beeping at a specified loudness and pitch at specified time intervals. Similarly, importance and/or urgency may be assigned to both a visual cue and a sound cue. For example, importance may be assigned to a visual cue of display size and to a sound cue of beeping at a specified loudness and pitch at specified time intervals.

The data item is displayed using the first and second visual cues (act 304). Displaying a data item using a first and second visual cue may provide a visual indication as to both the importance and the urgency of the data item. As shown in FIG. 2 by arrow 2, display module 241 causes a data item to be displayed at video display device 250. Display module 241 may use a first and second visual cue when causing a data item contained in personal information 200 to be displayed. Data items may be displayed at video output device 250 so as to provide a visual indication as to an importance level and urgency level associated with the data item. For example, display module 241 may display data item 220, to provide a visual cue as to a value associated with importance level 221 and a value associated with urgency level 222.

In some embodiments, display size (a first visual cue) may provide a cue as to the relative importance of the data item and display color (a second visual cue) may provide a cue as to the relative urgency of the data item. Data items with higher levels of importance may be displayed with increased size (i.e. taking up increased amounts of screen space when displayed) and data items with lower levels of importance may be displayed with decreased size (i.e., taking up decreased amounts of screen space when displayed). Data items classified as urgent may be displayed in the first color and data items classified as non-urgent may be displayed in the second color. Data items may be displayed using display size along with display color to simultaneously provide a visual cue as to both the importance and the urgency of the data item.

In may be that the importance and urgency of a data item correspond to one another. That is, a data item may have both increased importance and increased urgency or may have both decreased importance and decreased urgency. A data item having increased importance and having increased urgency may be displayed with increased size in an urgent color. On the other hand, a data item having decreased importance and having decreased urgency may be displayed with decreased size in a non-urgent color.

In other cases, the importance and urgency of a data item may not correspond to one another. That is, a data item may have increased importance and decreased urgency or may have decreased importance and increased urgency. A data item having increased importance and having decreased urgency may be displayed with increased size in a non-urgent color. On the other hand, a data item having decreased importance and having increased urgency may be displayed with decreased size in an urgent color.

Changes in the importance and/or urgency values for a data item may affect how a data item is displayed. When the importance value for a data item is increased, video output device 250 may be updated so that the display size of the data item is increased. Similarly, when the importance value for a data item is decreased, video output device 250 may be updated so that the display size of the data item is decreased. An importance value for a data item may change as a result of an updated user-indication.

When the urgency value for a data item is increased, video output device 250 may be updated so that the data item is displayed in an urgent color. Similarly, when the importance value for a data item is decreased, video output device 250 may be updated so that the data item is displayed in a non-urgent color. An urgency value for a data item may change as a result of an updated user-indication.

An updated user-indication may result when a user enters or an application program stores a new value for the importance or urgency of a data item. If a new value for the importance of a data-item differs from a current value for the importance of the data-item this may be viewed as an updated user-indication. Likewise, if a new value for the urgency of a data-item differs from a current value for the urgency of the data-item this may also be viewed as an updated user-indication.

Changes in importance and/or urgency levels of one data item may also affect how other data items are displayed. In some embodiments, more specific data items may be displayed within the boundaries of more general data items. For example, more specific data items for bank accounts, stocks, and insurance policies may be displayed within the boundaries of a more general data item for financial status.

Changes in the importance levels of more specific data items may affect the display of more general data items. When the importance level of a more specific data item is increased, the more specific data item may be displayed with increased size. To compensate for the increased display size of the more specific data item, the display size of the more general data item may also be increased. The more general data item may be displayed with increased size so that the more specific data item may still be displayed along with other more specific data items within the boundaries of the more general data item. Likewise, when a more specific data item is displayed with decreased size, a more general data item may also be displayed with decreased size.

Changes in the urgency levels of the more specific data items may also affect the display of more general data items. When a specified number of more specific data items are classified as urgent, this may cause a more general data item to also be classified as urgent. Thus, when the specified number of more specific data items is displayed in an urgent color, the more general data item may also be displayed in the urgent color. Likewise, when a specified number of more specific data items are classified as non-urgent, this may cause a more general data item to also be classified as non-urgent. Thus, when the specified number of more specific data items is displayed in a non-urgent color, the more general data item may also be displayed in the non-urgent color.

In some embodiments, screen space may be appropriately allocated between levels of relative importance so that each data item of the same level of importance is displayed the same size. Further, screen space may be allocated so that the total screen space consumed by all the data items equals or is less than the total screen space of a single video display device. Thus, a user may have a "complete view" of their personal information. For example, all the data items contained in personal information 200 may be displayed at video display device 250. When a new data item is to be displayed, the relative importance of existing data items is diluted. This causes the screen space allocated for existing data items to be reduced. These reductions free up screen space so the new data item along with all existing data items are still displayed on a single video display device.

Using a first visual cue for importance and a second visual cue for urgency when displaying data items enables a user to better judge what data items to act on and when to act. Including data items with a first and second visual cue in a "complete view" enables a user to better manage personal information, as all personal information is simultaneously viewable in a meaningful manner.

If computer system 240 is coupled to an audio output device (e.g. through audio output interface 130), the data item may be output using sound cues. A data item may be output using only sound cues or may be output using sound cues along with visual cues. Sounds associated with a data item may be emitted at an audio output device, while visual cues are displayed at video display device 250.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system including a display device, a method for presenting personal information at the display device so as to indicate both the importance and the urgency of the personal information, the method comprising the following:

storing a document containing a plurality of hierarchically arranged nodes that represent a corresponding plurality of data items, wherein the hierarchically arranged nodes include at least a first node having at least one subnode and at least one leaf node, wherein said first node includes an importance attribute and an associated importance attribute value corresponding to a respective data item, the importance attribute value comprising a numeric importance value within a first range of numeric values, and wherein said at least one leaf node includes:
an urgency attribute;
an urgency value that comprises a numeric value within a second range of numeric values; and
a reference to an urgency calculator that is used to calculate the urgency value; and an act of displaying the plurality of data items at the display device by displaying the personal information along with the urgency numeric value and the importance numeric value for each of the plurality of data items wherein each of the plurality of data items is displayed in such a manner as to reflect a relative importance and a relative urgency of the data item with respect to the other displayed data items such that the display of each of the plurality of data items is dynamically and automatically modified to reflect the relative importance and urgency of the corresponding data item with respect to the other displayed data items.

2. A method as recited in claim 1, wherein the importance numeric value for each respective data item reflects a relative importance to a user that a suggested action associated with each respective data item be accomplished or engaged in, relative to any importance for engaging in or accomplishing actions associated with the one or more additional data items, and wherein the urgency value is a calculated value that reflects a degree to which an immediate action or course of action on the part of the user is suggested, and relative to an urgency of at least one additional data item.

3. A method as recited in claim 1, wherein the urgency calculator automatically calculates the urgency numeric value based on a deadline.

4. A method as recited in claim 1, wherein the urgency calculator automatically calculates the urgency numeric value based on available free time.

5. A method as recited in claim 4, wherein the urgency calculator automatically calculates the urgency numeric value based on a budget.

6. A method as recited in claim 1, wherein the urgency calculator automatically calculates the urgency numeric value based on financial data.

7. A method as recited in claim 1, wherein the urgency value comprises an average of a plurality of urgency values.

8. A method as recited in claim 1, wherein the document comprises an XML document.

9. A method as recited in claim 1, wherein the method further includes storing an XML tag identifying a name, an XML tag identifying an importance and an XML tag identifying an urgency for each of the data items so as to enable the storage of the data items in a unified format even though the data items correspond to different application types.

10. A storage media storing computer-executable instructions for implementing the method recited in claim 1.

11. A storage media as recited in claim 10, wherein the storage media comprises a computing system.

12. A method as recited in claim 1, wherein the reference to the urgency calculator comprises location information for accessing the urgency calculator.

13. A method as recited in claim 12, wherein the reference to the urgency calculator comprises an IP address.

14. A method as recited in claim 13, wherein the reference to the urgency calculator comprises a URL attribute and value.

15. A method as recited in claim 1, wherein the reference to the urgency calculator comprises a SOAP call.

16. A method as recited in claim 1, wherein the reference to the urgency calculator comprises an address local to the computer system.

17. A method as recited in claim 1, wherein the reference to the urgency calculator comprises a Domain Name Service.

18. A method as recited in claim 1, wherein the hierarchically arranged nodes include a plurality of leaf nodes and wherein each of the plurality of leaf nodes references a different type of urgency calculator used to calculate different urgency values.

19. A method as recited in claim 1, wherein the plurality of data items correspond to a plurality of different application program types.

20. A method as recited in claim 1, wherein the size of a data item is dynamically and automatically modified to indicate the importance of the data item with respect to other displayed data items, and the color of a data item is dynamically and automatically modified to indicate the urgency of the data item with respect to the other displayed data items.

* * * * *